United States Patent
Moon et al.

(10) Patent No.: US 11,235,493 B2
(45) Date of Patent: Feb. 1, 2022

(54) PREPREG PREPARATION DEVICE AND PREPREG PREPARATION METHOD USING SAME

(71) Applicant: LG HAUSYS, LTD., Seoul (KR)

(72) Inventors: Young-E Moon, Anyang-si (KR); Jong-Sung Park, Daejeon (KR); Kang-Hyun Song, Anyang-si (KR); Hee-Jung Lee, Anyang-si (KR); Hee-June Kim, Seongnam-si (KR)

(73) Assignee: LG HAUSYS, LTD., Seoul (KR)

( * ) Notice: Subject to any disclaimer, the term of this patent is extended or adjusted under 35 U.S.C. 154(b) by 274 days.

(21) Appl. No.: 16/074,962

(22) PCT Filed: Dec. 27, 2016

(86) PCT No.: PCT/KR2016/015309
§ 371 (c)(1),
(2) Date: Aug. 2, 2018

(87) PCT Pub. No.: WO2017/135575
PCT Pub. Date: Aug. 10, 2017

(65) Prior Publication Data
US 2019/0054661 A1    Feb. 21, 2019

(30) Foreign Application Priority Data
Feb. 3, 2016    (KR) .................... 10-2016-0013623

(51) Int. Cl.
*B29B 15/12*    (2006.01)
*B29K 307/04*    (2006.01)
*B29K 309/08*    (2006.01)

(52) U.S. Cl.
CPC ........ *B29B 15/122* (2013.01); *B29K 2307/04* (2013.01); *B29K 2309/08* (2013.01)

(58) Field of Classification Search
CPC ... B29B 15/122; B29B 15/10; B29K 2307/04; B29K 2309/08; B29C 33/0077;
(Continued)

(56) References Cited

U.S. PATENT DOCUMENTS

| 2010/0279114 | A1* | 11/2010 | Tobisawa | B29B 15/125 |
| | | | | 428/378 |
| 2013/0136890 | A1* | 5/2013 | Maliszewski | B29C 48/345 |
| | | | | 428/113 |
| 2014/0093649 | A1 | 4/2014 | Johnson et al. | |

FOREIGN PATENT DOCUMENTS

| JP | S61-150958 A | 7/1986 |
| JP | 2000-61939 A | 2/2000 |

(Continued)

OTHER PUBLICATIONS

English translation from GooglePatents for JP-2000061939-A, Feb. 2000, Abe, Norihiro, (Year: 2000).*

(Continued)

*Primary Examiner* — Matthew J Daniels
*Assistant Examiner* — Gregory C. Grosso
(74) *Attorney, Agent, or Firm* — Hauptman Ham, LLP

(57) ABSTRACT

A prepreg preparation device and a prepreg preparation method using the same are disclosed. According to an embodiment of the present invention, the prepreg preparation device comprises: a flow path-type impregnation part for impregnating, with a resin, a reinforced fiber transferred along a flow path; and a box-type impregnation part for impregnating, with the resin, the reinforced fiber transferred through a box-type space by passing through the flow path-type impregnation part.

4 Claims, 1 Drawing Sheet

(58) Field of Classification Search
CPC ....... B29C 70/345; B29C 70/54; B29C 70/50;
B29C 70/523; C08J 5/24
USPC ........................................................ 264/299
See application file for complete search history.

(56) References Cited

FOREIGN PATENT DOCUMENTS

| | | | | |
|---|---|---|---|---|
| JP | 2011131422 A | * | 7/2011 | ............... B29B 9/06 |
| JP | 2012-16857 A | | 1/2012 | |
| JP | 2014-58136 A | | 4/2014 | |
| JP | 5626660 B2 | | 11/2014 | |
| JP | 5774465 B2 | | 9/2015 | |
| KR | 2001-0048600 A | | 6/2001 | |
| KR | 10-2013-0091255 A | | 8/2013 | |
| KR | 10-2014-0020459 A | | 2/2014 | |
| WO | 2012-149122 A1 | | 11/2012 | |

OTHER PUBLICATIONS

European Search Report dated Jan. 14, 2019, in connection with counterpart European Patent Application No. 16889552.2.
International Search Report for corresponding international application PCT/KR2016/015309 dated Mar. 17, 2017.
Chinese Office Action dated Jan. 18, 2021, in connection with the Chinese Patent Application No. 201680081002.5.

* cited by examiner

PREPREG PREPARATION DEVICE AND PREPREG PREPARATION METHOD USING SAME

CROSS REFERENCE TO RELATED APPLICATION

This present application is a national stage filing under 35 U.S.C § 371 of PCT application number PCT/KR2016/015309 filed on Dec. 27, 2016 which is based upon and claims the benefit of priority to Korean Patent Application No. 10-2016-0013623 filed on Feb. 3, 2016 in the Korean Intellectual Property Office. The disclosures of the above-listed applications are hereby incorporated by reference herein in their entirety.

TECHNICAL FIELD

The present invention relates to a prepreg preparation device and a prepreg preparation method using the same.

BACKGROUND ART

Generally, a fiber reinforced composite material refers to a material which is made by binding at least two materials, and a representative example includes a material in which a reinforcement material such as a glass, a carbon fiber, etc. is impregnated with a mother material such as a resin (e.g., a polymer resin, etc.).

Recently, more and more interest is paid in a continuous fiber reinforced composite material among many fiber reinforced composite materials.

The continuous fiber reinforced composite material refers to a composite material which is prepared by impregnating the reinforced fiber continuously with the mother material in contrast to a conventional short fiber reinforced composite material or a long fiber reinforced composite material.

Thanks to this feature, during a preparation process, a higher ratio of the reinforcement material can be impregnated with the continuous fiber reinforced composite material than the conventional short fiber reinforced composite material or the long fiber reinforced composite material, which results in an advantage of guaranteeing a higher degree of mechanical property than the conventional materials.

This continuous fiber reinforced composite material is prepared by a weaving or stacking method and the stack type continuous fiber reinforced composite material of the continuous fiber reinforced composite material is formed by stacking unidirectional reinforced continuous fiber prepregs in various directions such as 0-90 degrees and binding the prepregs.

By the way, in the process using these unidirectional reinforced continuous fiber prepregs, a resin impregnation ratio of the resin within the fiber in the impregnation mold plays an important part.

FIG. 1 is a diagram which schematically illustrates a general prepreg preparation device according to the prior art.

When referring to FIG. 1, the prepreg preparation device 10 according to the conventional scheme is formed in a box like shape.

And an inner space of the box shape mold 11 is filled with a resin R.

Meanwhile, a reinforced fiber is introduced through an inlet which is provided at one side of the mold 11, and the reinforced fiber is ejected through an outlet 40 which is provided at the other side of the mold 11.

In the meantime, the reinforced fiber is transferred from the one side to the other side of the mold 11 by way of a plurality of pin members 13 which are installed inside the mold 11, and during this process, a surface of the reinforced fiber is impregnated with the resin which fills inside the mold 11.

By the way, according to the prior art, the resin is required excessively since the mold as a whole is formed in a box like shape. Also, discoloration can occur on the surface of the prepreg as the amount of resin remaining inside the mold increases.

In addition, it is difficult to guarantee superb impregnation performance since the impregnation ratio of the resin within the prepregs depends only on the pin members.

The prior art related to the present invention includes a Korea Patent Publication No. 10-2001-0048600 which is published on Jun. 15, 2001 and discloses a matrix resin composition and a prepreg for a fiber reinforced composite, and the fiber reinforced composite material.

DETAILED DESCRIPTION OF THE INVENTION

Technical Problem

The objective of the present invention is to provide a prepreg preparation device which improves the impregnation ratio of the resin within the fiber, decreases surface color defects, and improves surface uniformity by providing both a flow path-type first impregnation part and a box-type second impregnation part in a single impregnation mold.

Also, another objective of the present invention is to provide a prepreg preparation method using the prepreg preparation device which includes both the flow path-type first impregnation part and the box-type second impregnation part in the single impregnation mold.

The objectives to be solved by the present invention are not limited to the aforementioned objective(s), and other objective(s) which are not clearly noted here can be clearly understood by a skilled artisan based on the description to be followed.

Technical Solution

The prepreg preparation device according to an embodiment of the present invention comprises a flow path-type impregnation part which impregnates, with a resin, a reinforced fiber transferred along a flow path; and a box-type impregnation part which impregnates, with the resin, the reinforced fiber which passes through the flow path-type impregnation part and is transferred through a box-type space.

Here, the flow path-type impregnation part and the box-type impregnation part can be formed as an integral part within a single mold.

Also, the flow path is formed in a triangular wave shape along a length directional cross-section of the flow path-type impregnation part.

In addition, the flow path preferably has a flow cross-sectional area of a constant size along an overall length of the flow path.

Also, in the box-type space, there are provided a plurality of pin members for transferring the reinforced fiber which has passed through the flow path-type impregnation part.

In addition, the pin members can be configured to rotate while alternately touching an upper surface and a lower surface of the reinforced fiber.

Also, the pin members are positioned at the same height, and each of the pin members can be formed to be apart from each other by a set distance.

A prepreg preparation method using the prepreg preparation device according to another embodiment of the present invention comprises a step (a) in which a mold having a flow path-type impregnation part and a box-type impregnation part is prepared; a step (b) in which a reinforced fiber is primarily impregnated through the flow path-type impregnation part; and a step (c) in which the reinforced fiber, which has been primarily impregnated, is secondarily impregnated through the box-type impregnation part.

Here, the amount of the resin, which is applied on a surface of the reinforced fiber, is uniformized by the secondary impregnation in the step (c).

Advantageous Effects

By adopting the embodiments of the invention, it is possible to reduce the use amount of the resin compared to the prior art by providing both a flow path-type first impregnation part and a box-type second impregnation part in a single impregnation mold.

Also, a melt pool can be readily formed and the surface color of the prepreg can be improved by reducing the amount of a remaining resin. In addition, the resin impregnation ratio can be improved.

Also, it is possible to provide a prepreg having improved flexural strength and flexural modulus.

BEST MODE

In the following, preferred embodiments of the present invention will be explained in detail by referring to the appended figures.

It is to be noted that the present invention is not restricted to the embodiments disclosed in the following and can be realized in various different configurations, and the embodiments are provided to fully disclose the present invention and help a person with an ordinary skill in the art completely understand the categories of the present invention.

A fiber reinforced composite material refers to a material which is made by binding at least two materials, and a representative example is a material in which a reinforcement material such as a glass, a carbon fiber, etc. is impregnated with a mother material such as a resin(e.g., a polymer resin, etc.).

Among various fiber reinforced composite materials, a continuous fiber reinforced composite material refers to a composite material which is prepared by impregnating the reinforced fiber continuously with the mother material in contrast to a conventional short fiber reinforced composite material or a long fiber reinforced composite material.

More specifically, a higher ratio of the reinforcement material can be impregnated with the continuous fiber reinforced composite material than the conventional short fiber reinforced composite material or long fiber reinforced composite material, which results in an advantage of guaranteeing a higher degree of mechanical property than conventional materials.

For example, the stack type continuous fiber reinforced composite material is formed by stacking unidirectional reinforced continuous fiber prepregs (referred to as 'prepregs', hereinafter) in various directions such as 0-90 degrees and binding the prepregs. And, a resin impregnation ratio in the reinforced fiber within the impregnation mold is crucial in a process using the prepregs.

Figure 2:
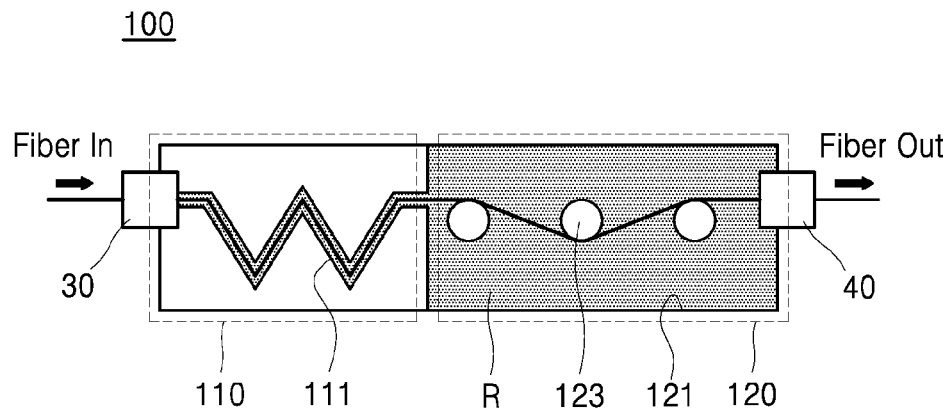
FIG. 2 is a conceptual diagram which schematically illustrates the prepreg preparation device according to an embodiment of the present invention.

FIG. 2 is a conceptual diagram which schematically illustrates the prepreg preparation device according to an embodiment of the present invention.

When referring to FIG. 2, the prepreg preparation device 100 shown in the figure includes a flow path-type impregnation part 110 and a box-type impregnation part 120.

That is, the prepreg preparation device 100 according to an embodiment of the present invention is different from the conventional configuration and can include both the flow path-type impregnation part 110 having a flow path-type impregnation area and the box-type impregnation part 120 having a box-type impregnation area within the flow path-type impregnation area.

A flow path 111, which penetrates a corresponding section in a length direction, can be provided inside the flow path-type impregnation part 110.

A reinforced fiber (Fiber), which has been supplied through an inlet 30 connected with the flow path 111 can be impregnated with the resin R filling inside the flow path 111 while passing through the 111.

Here, the flow path 111 is preferably formed in a triangular wave shape along a length directional cross-section of the flow path-type impregnation part 110; however, the shape of the flow path is not restricted to this configuration.

Therefore, the flow path 111 can be different from the illustrated shape and can be formed in an undulating shape, and upper and lower corner areas can be rounded. Various modifications can also be made to the shape of the flow path.

As a specific example, the flow path 111 can have a cross-sectional shape similar to the letter "W" as shown in FIG. 2.

In addition, it is preferred that the flow path 111 has a flow cross-sectional area of a constant size along an overall length of the flow path. This constant size is preferred in order to allow the amount of the resin filling inside the flow path 111 to be constant over all of the cross-section of the flow path 111, and the shape of the flow path is not restricted to this.

By adopting the shape of the flow path 111 as above, the use amount of the resin used in the flow path-type impregnation part 110 can be greatly reduced compared to the prior art, and the amount of the resin remaining in the flow path 111 can also be reduced and, which prevents degradation in the color of the prepreg due to the resin stored at a high temperature.

In this manner, the reinforced fiber can be primarily impregnated with the resin R, which fills inside the flow path 111, while being transferred by way of the flow path 111 of the impregnation part 110.

Subsequently, the reinforced fiber, which has been primarily impregnated through the flow path-type impregnation part 110, is transferred to pass through the box-type impregnation part 120 and then impregnated for the second time.

The box-type impregnation part 120 can impregnate the reinforced fiber, which has passed through the flow path-type impregnation part 110 and then passes through a box-type space 121, with the resin R.

The box-type space 121 can be connected with an end of the flow path 111 as shown in the figure and can be configured in an enclosed configuration such that the inner space except for the areas required for introducing and ejecting the reinforced fiber can be fully filled with the resin R to store the resin.

Also, in the box-type space 121, there can be provided a plurality of pin members arranged along a horizontal direction to transfer the reinforced fiber which has passed through the flow path-type impregnation part 10.

As a specific example, the pin members 123 can be positioned at the same height within the box-type space 121 as shown in FIG. 2.

And, the pin members 123 can be formed to be apart from each other by a set distance.

Although there are three pin members 123 shown in FIG. 2, the number of the pin members can vary.

Some of the pin members 123 configured as above are arranged to rotate while touching an upper surface of the reinforced fiber, while the rest are arranged to rotate while touching a lower surface of the reinforced fiber.

It is preferred that the pin members, which rotate while touching the upper surface of the reinforced fiber, and the pin members, which rotate while touching the lower surface of the reinforced fiber, are arranged in an alternate manner. However, the arrangement of the pin members is not restricted to this.

Figure 1:
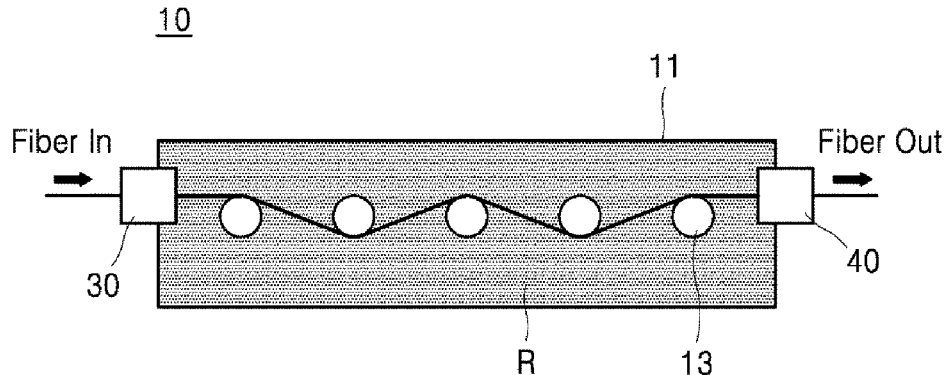
FIG. 1 is a conceptual diagram which schematically illustrates a general prepreg preparation device according to the prior art.

The prepreg preparation device 100 according to an embodiment of the present invention is different from the conventional prepreg preparation device 10 as shown in FIG. 1 and it can greatly reduce the use amount of the resin required for forming a melt pool.

Also, the color degradation phenomenon due to a discolored resin on the surface of the prepreg can be improved since the amount of the resin remaining within the mold is decreased.

In addition, since the resin forms the melt pool within the narrow flow path 111, the resin impregnation ratio in the reinforced fiber introduced into the flow path 111 can be expected to be improved thanks to the pressure conditions within the flow path and the tension applied on the reinforced fiber.

Figure 3:
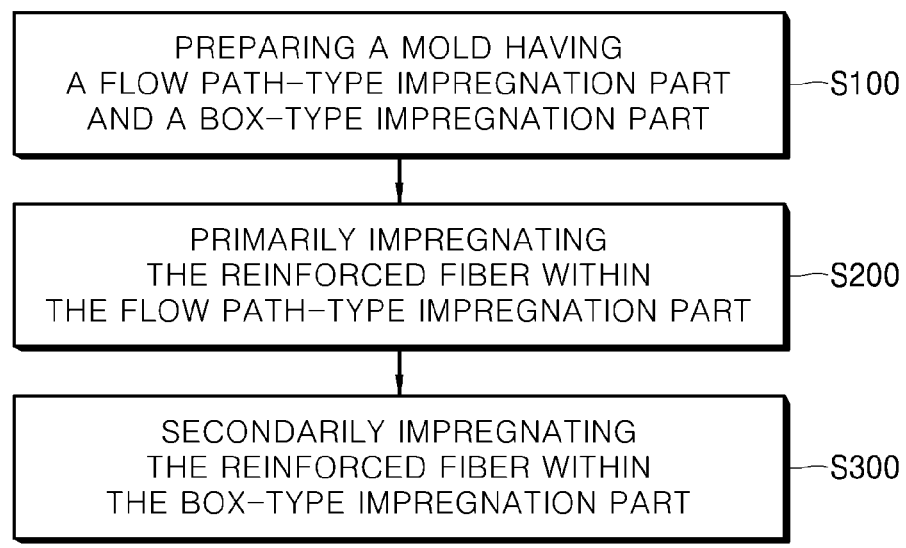
FIG. 3 is a flowchart which schematically illustrates the prepreg preparation method according to another embodiment of the present invention.

FIG. 3 is a flowchart which schematically illustrates the prepreg preparation method according to another embodiment of the present invention.

When referring to FIG. 3, the prepreg preparation method as shown includes a mold preparation step S100, a primary impregnation step S200, and a secondary impregnation step S300.

Mold Preparation Step (S100)

This step is a mold preparation step, and a mold including the aforementioned flow path-type impregnation part and the box-type impregnation part is prepared in this step.

When referring to FIG. 2, a schematic shape of the prepreg preparation device, that is, the impregnation mold having both the flow path-type impregnation part 110 and the box-type impregnation part 120 can be acknowledged.

Primary Impregnation Step (S200)

This step is a primary impregnation step, and corresponds to the step in which the reinforced fiber is primarily impregnated with the resin through the flow path-type impregnation part (110, refer to FIG. 2) which has been prepared in the previous step.

Secondary Impregnation Step (S300))

This step is a secondary impregnation step, and corresponds to the step in which the reinforced fiber, which has been primarily impregnated with the resin through the flow path-type impregnation part (110, refer to FIG. 2), is impregnated for the second time in the box-type impregnation part 120 (refer to FIG. 2).

By adopting the secondary impregnation in this step, the impregnated resin can be applied uniformly on the surface of the reinforced fiber, which results in a uniform and improved resin impregnation ratio.

Meanwhile, when referring to Table 1, it is possible to acknowledge that the flexural strength and the flexural modulus of the prepreg which has been prepared by the aforementioned prepreg preparation method (referred to as an EMBODIMENT, hereinafter) are improved compared to the conventional prepreg preparation device shown in FIG. 1 (referred to as a COMPARATIVE EXAMPLE, hereinafter) under the same conditions.

TABLE 1

|  |  | COMPARATIVE EXAMPLE | EMBODIMENT |
| --- | --- | --- | --- |
| flexural strength | MPa | 404 | 423 |
| flexural modulus | GPa | 19.2 | 19.8 |

As described in the above, by adopting the configuration and effects of the present invention, it is possible to reduce the use amount of the resin compared to the prior art by providing both a flow path-type first impregnation part and a box-type second impregnation part in a single impregnation mold.

Also, according to the embodiments of the present invention, a melt pool can be readily formed and the surface color of the prepreg can be improved by reducing the amount of a remaining resin. In addition, the resin impregnation ratio can be improved.

Although the present invention has been explained by referring to the appended figures as in the above, it is to be noted than the present invention is not restricted to the embodiments and figures disclosed with this specification, and that various modifications can be made by the person having ordinary skill in the art within the scope of the technical spirit of the present invention. And, it is apparent that, although the effects according to the configuration of the present invention are not clearly written and described while explaining the embodiments of the present invention, any effect, which can be predicted by the corresponding configuration, can also be anticipated.

The invention claimed is:

1. A prepreg preparation device comprising:
   a flow path-type impregnation part which impregnates, with a resin, a reinforced fiber transferred along a flow path; and
   a box-type impregnation part which impregnates, with the resin, the reinforced fiber which passes through the flow path-type impregnation part and is transferred through a box-type space,
   wherein the flow path-type impregnation part and the box-type impregnation part are formed as an integral part within a single mold,
   wherein the box-type space is connected to an end of the flow path and is in an enclosed configuration such that an inner space thereof, except for areas for introducing and ejecting the reinforced fiber, is fully filled with the resin to store the resin, wherein the flow path-type impregnation part has a flow path-type impregnation area, wherein the flow path has a triangular wave shape along a length directional cross-section of the flow path-type impregnation part, wherein a cross-sectional area of the flow path has a constant size along an overall length of the flow path, in order to allow the amount of the resin filling inside the flow path to be constant over all of the cross-section of the flow path, wherein the resin forms a melt pool within the flow path, wherein the reinforced fiber is impregnated with the resin R, which fills inside the flow path, wherein the box-type impregnation part has a box-type impregnation area, wherein the reinforced fiber, which is impregnated through the flow path-type impregnation part, is transferred to pass through the box-type impregnation part and then impregnated for a second time, wherein the flow path-type impregnation part and the box-type impregnation part are arranged to be connected before and after within a single mold, wherein the flow path and the box-type space are filled with same resin, wherein a connection portion between the end of the flow path and the box-type space is capable of movement of the reinforced fiber and the resin, wherein, in the box-type space, there are provided a plurality of pin members for transferring the reinforced fiber which has passed through the flow path-type impregnation part, and wherein the pin members rotate while alternately touching an upper surface and a lower surface of the reinforced fiber.

2. The prepreg preparation device of claim 1, wherein the pin members are positioned at the same height, such that the pin members are formed to be apart from each other by a set distance.

3. A prepreg preparation method using the prepreg preparation device of claim 1, comprising;

a step (a) in which a mold having a flow path-type impregnation part and a box-type impregnation part is prepared;

a step (b) in which a reinforced fiber is primarily impregnated through the flow path-type impregnation part; and a step (c) in which the reinforced fiber, which has been primarily impregnated, is secondarily impregnated through the box-type impregnation part.

4. The prepreg preparation method of claim 3, wherein the amount of the resin, which is applied on a surface of the reinforced fiber, is uniformized by the secondary impregnation in the step (c).

* * * * *